US005245358A

United States Patent [19]

Reeves et al.

[11] Patent Number: 5,245,358

[45] Date of Patent: Sep. 14, 1993

[54] SUSTRATE SUPPORT FOR USE IN A THERMAL PHASE CHANGE INK PRINTING APPARATUS

[75] Inventors: Barry D. Reeves, Lake Oswego; James D. Rise, Beaverton, both of Oreg.

[73] Assignee: Tektronix, Inc., Wilsonville, Oreg.

[21] Appl. No.: 716,428

[22] Filed: Jun. 17, 1991

[51] Int. Cl.[5] .................... G01D 15/24; G01D 15/26

[52] U.S. Cl. .................... 346/138; 271/275; 271/277

[58] Field of Search .................... 355/200, 208, 271, 274, 355/308, 309, 312, 315; 346/138, 134; 271/275, 277

[56] References Cited

U.S. PATENT DOCUMENTS

| | | | |
|---|---|---|---|
| 3,581,257 | 5/1971 | Priessnetz | 346/138 X |
| 3,729,311 | 4/1973 | Langdon | 355/274 |
| 3,906,512 | 9/1975 | Farlow | 346/138 |
| 4,607,935 | 8/1986 | Kindt et al. | 355/274 |
| 4,947,209 | 8/1990 | Maeno et al. | 355/208 X |
| 4,947,215 | 8/1990 | Chuang | 355/274 |
| 4,973,991 | 11/1990 | Raijmahers | 346/138 |
| 4,982,207 | 1/1991 | Tunmore et al. | 346/138 |

*Primary Examiner*—A. T. Grimley
*Assistant Examiner*—William J. Royer
*Attorney, Agent, or Firm*—John D. Winkelman; Ann W. Speckman

[57] ABSTRACT

A print drum and associated clamping assembly is provided for use in printing or similar operations. The print drum is characterized by uniform thermal characteristics and is constructed from a material having thermal diffusivity of greater than about $1.3 \times 10^{-5}$ m$^2$/sec. The print drum may moreover have a highly reflective surface that permits optical sensors to distinguish between the drum and substrate surfaces. Clamping sections of a substrate clamp assembly project through slots provided in the print drum and are raised and lowered to release and clamp a substrate respectively. Other constituents of the clamp assembly are mounted in the hollow interior of the print drum. The print drum and associated clamping mechanism is especially suitable for use in ink jet printing apparatus utilizing thermal phase change inks.

23 Claims, 3 Drawing Sheets

SUSTRATE SUPPORT FOR USE IN A THERMAL PHASE CHANGE INK PRINTING APPARATUS

TECHNICAL FIELD

The present invention relates generally to substrate supports and associated clamping mechanisms for supporting and gripping a print substrate during printing or similar operations. The substrate supports and associated clamping mechanisms of the present invention are especially suitable for use in ink jet printing apparatus that utilize phase change inks to produce printed images.

BACKGROUND OF THE INVENTION

Ink jet printers operate by ejecting ink onto a print substrate, such as paper, in controlled patterns of dots. By selectively regulating the pattern of ink droplets, such ink jet printers can be used to produce a wide variety of printed images, including text, graphics, and the like. Moreover, ink jet printers are capable of recording permanent images on a wide variety of substrates, including both light reflective and light transmissive substrates.

Ink jet printers utilize a variety of inks, including thermal phase change inks. In general, phase change inks are solid at ambient temperatures and liquid at the elevated operating temperatures of an ink jet printing device. Liquid phase ink droplets are ejected from the printing device at an elevated operating temperature and, when the ink droplets contact the surface of a substrate, they rapidly solidify.

Early references to phase change inks for ink jet printing involved monochrome inks jetted by electrostatic printing devices. Thus, for example, U.S. Pat. No. 3,653,932 discloses a low melting point (30° C. to 50° C.) ink having a base comprising diesters of sebacic acid. In a similar process, U.S. Pat. No. 3,715,219 describes low melting point (30° C. to 60° C.) inks including a paraffin alcohol-based ink. One disadvantage of printing with low melting point phase change inks is that they frequently exhibit offset problems. Specifically, when substrates printed with these inks are stacked and stored for subsequent use, the ink adheres to adjacent surfaces, particularly if the printed substrates are exposed to high ambient temperatures.

Phase change inks are well known in the art. U.S. Pat. Nos. 4,390,369 and 4,484,948 describe methods for producing monochrome phase change inks that employ a natural wax ink base, such as Japan wax, candelilla wax, and carnauba wax, which are subsequently printed from a drop-on-demand ink jet device at a temperature ranging between 65° C. and 75° C. U.S. Pat. No. 4,659,383 discloses a monochrome ink composition having an ink base including a C20-24 acid or alcohol, a ketone, and an acrylic resin plasticizer. These monochrome ink compositions are not durable and, when printed, may become smudged upon routine handling and folding.

Japanese Patent Application No. 128,053/78 discloses the use of aliphatic and aromatic amides that are solid at room temperature, such as acetamide, as printing inks. U.S. Pat. No. 4,684,956 is directed to monochrome phase change inks utilizing synthetic microcrystalline wax (hydrocarbon wax) and microcrystalline polyethylene wax. This molten composition can be applied to a variety of porous and non-porous substrates using drop-on-demand ink jet application techniques.

European Patent Application Nos. 0 187 352 and 0 206 286 disclose phase change ink jet printing in color. The ink bases for these systems include fatty acids, a thermoplastic polyethylene and a phase change material in the first application; and the alcohol portion of a thermosetting resin pair, a mixture of organic solvents (o- and p-toluene sulfonamide) and a dye in the second application.

The development of phase change inks that are substantially transparent, i.e., inks that transmit substantially all of the light that impinges on them, has improved the quality of images printed on light transmissive substrates. Phase change ink compositions disclosed in U.S. Pat. No. 4,889,761 are exemplary and may be used for a variety of applications.

Ink jet printers typically utilize a support surface to support the substrate during printing. A print head having multiple ink orifices ejects ink droplets as it is reciprocated in close proximity to the surface of the print substrate. The print substrate is generally indexed at predetermined intervals to position different areas of the substrate for printing.

Precise placement of ink droplets is required to provide high quality printed images. For ink jet printing devices with reciprocating print heads to provide precise ink drop placement, the distance between the print substrate and the print head must be maintained to a very close tolerance. A multi-orifice print head must also have a tight parallelism tolerance between the jet orifice plane and the printed substrate plane.

Thermal phase change ink print quality is furthermore affected by the rate of ink droplet solidification on the print substrate. Rapid solidification of the ink droplets reduces migration of ink along the print substrate and fusing of adjacent ink droplets, thereby providing high quality images on a wide variety of print substrates. The substrate support is an important factor influencing the rate of ink droplet solidification for any given printing speed, ink jet array, and print substrate. Substrate support surfaces that cannot effectively dissipate thermal energy during printing operations are therefore undesirable because they tend to reduce the rate of ink drop solidification as they are heated during printing operations.

Substrate support surfaces that cannot effectively dissipate thermal energy during printing operations may also cause non-uniform expansion and wrinkling of print substrates during printing operations. Substrate expansion and wrinkling may be caused by thermal expansion or changes in the moisture content of the print substrate, or a combination of both factors. Many types of print substrates, including a variety of papers, are prone to expansion and wrinkling at high temperatures. This may result in substrate feed problems, as well as lower print quality resulting from variations in the distance between the print substrate and the print head.

It would therefore be desirable to provide a substrate support surface having thermal properties that are conducive to printing of thermal phase change inks. The substrate support should provide a thermal backing for the substrate that optimizes print quality and the ability to control the ink applied to the substrate. Moreover, the support surface desirably accommodates a clamp assembly that holds the leading edge of the print substrate during printing and releases the printed substrate after the printing operation has been completed.

SUMMARY OF THE INVENTION

The substrate support of the present invention is characterized by uniform thermal characteristics. Additionally, the substrate support promotes rapid phase change ink solidification rates to produce higher quality images and enhanced throughput. The substrate support is constructed from a material having a thermal diffusivity of greater than about $1.3\times10^{-5}$ m²/second and, according to a preferred embodiment, may be provided as a hollow, cylindrical print drum.

In addition to the uniform thermal characteristics and specified thermal diffusivity properties, the substrate support of the present invention may have a highly reflective substrate contact surface. A reflective surface permits optical sensors to distinguish between the support surface and the print substrate positioned thereon. This information can then be used by the printer to accurately position the printed image on the substrate. The support surface may also be provided with an aperture that can be detected, such as by optical sensors, to provide information concerning the rotational orientation of the surface and to confirm proper alignment of print substrates in a clamp assembly.

Substrate supports of the present invention preferably have a substrate clamp assembly mounted and interlocked thereon. The substrate clamp assembly holds an edge of the substrate during printing and serves to maintain the substrate in a stationary position relative to the substrate support. Additionally, the clamp assembly is operable regardless of the rotational orientation of the substrate support or print drum to facilitate its use with a variety of different substrate sizes. The clamp assembly is actuated, for example, by a linear actuator assembly.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, in which.

DETAILED DESCRIPTION OF PREFERRED EMBODIMENTS

Figure 2:
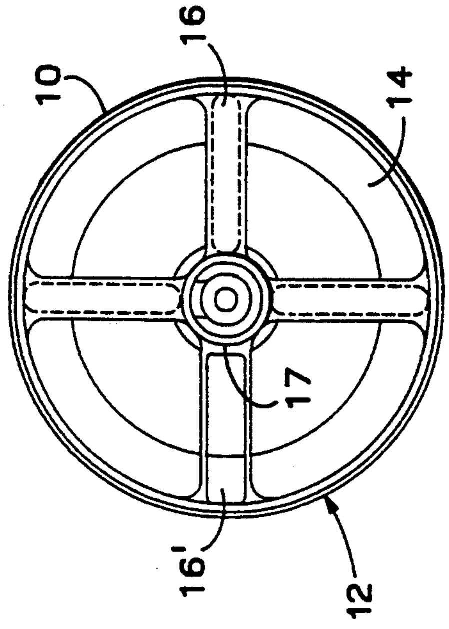
FIG. 2 shows a schematic end view of the print drum of FIG. 1.
Figure 1:
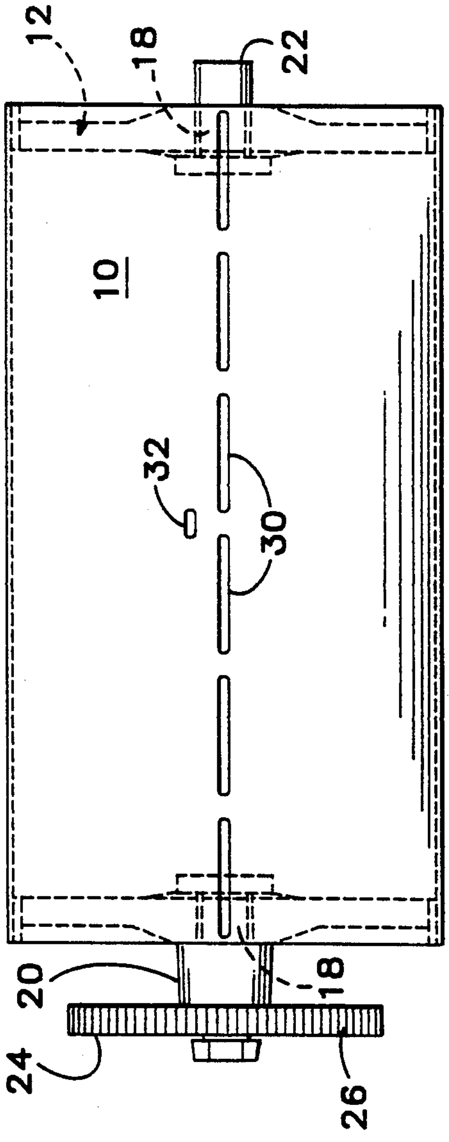
FIG. 1 shows a schematic front view of a substrate support in the form of a print drum with associated mounting and drive apparatus.

FIGS. 1 and 2 illustrate preferred embodiments of the substrate support assembly of the present invention. The substrate support illustrated in FIG. 1 is a print drum assembly comprising a hollow cylindrical drum member 10 constructed from a rigid material in such a manner that it exhibits substantially uniform thermal properties over its entire surface area. Drum member 10 preferably comprises a uniform thickness cylindrical tube that has sufficient structural strength and rigidity that it does not require an internal support structure. Although the hollow cylindrical drum member is a preferred form of a substrate support, alternative substrate support configurations may be utilized in accordance with the present invention. The substrate support may alternatively be provided as a curved or a planar surface having the characteristics described herein.

The exterior surface of print drum member 10 provides a contact surface for the print substrate during printing operations. In ink jet printing applications, for example, the distance between the print substrate and the print head must be maintained to a very close tolerance to provide high quality printing. The distance between an ink jet print head and the drum surface may, for example, be less than 1 mm for many printing applications. The contact surface of the print drum member must therefore be precisely constructed to eliminate discontinuities that are out of tolerance. Furthermore, the contact surface of print drum member 10 exhibits a high degree of rigidity to prevent it from being dented or deformed during printing, handling or assembly operations.

The thermal properties of print drum member 10 may be attributable, in part, to the material of construction and, in part, to the design geometry of the print drum assembly. An important feature of the substrate support of the present invention is that it exhibits uniform thermal characteristics over its entire surface area. The thermal properties of the print drum influence the rate of ink droplet solidification during printing of thermal phase change inks, and hence influence the quality of the printed product. Print drum members comprising a material that promotes rapid thermal phase change ink solidification are preferred.

Additionally, print drum member 10 is preferably characterized by low rotational inertia. Generally, the lower the rotational inertia of the substrate support, the less time is required for rotational vibration (ringing) to subside after rotational indexing of the print drum. Providing a print substrate having low rotational inertia properties therefore accelerates the printing process and assures high quality printed products by providing accurate ink placement.

One thermal property that expresses the desired thermal characteristics of print drum member 10 is thermal diffusivity. Thermal diffusivity is an expression of the diffusion coefficient for thermal energy and is a function of the thermal conductivity, specific heat, and density of a material. Specifically, print drum members 10 according to the present invention are preferably constructed from a material having a thermal diffusivity of greater than about $1.3\times10^{-5}$ m²/sec, and most preferably greater than about $5.0\times10^{-5}$ m²/sec. Suitable materials include aluminum, magnesium, plastics, composite structures, and the like.

Aluminum has a thermal diffusivity greater than about $5.0\times10^{-5}$ m²/sec and is an especially preferred material of construction for print drum member 10. A preferred print drum member 10 is constructed from a thin-walled aluminum extrusion having a thickness of from about 1.0 to 3.0 mm, and most preferably about 1.3 mm. The aluminum extrusion is cut to length and may be counterbored for receiving end bells or the like. Because the surface of print drum member 10 is required to be so precisely formed, the drum member is preferably diamond turned to precise diametral and runout tolerances prior to installation in a printer apparatus. Cylindrical runout tolerances of about 75 microns and diametral tolerances of about ±75 microns are exemplary.

The exterior substrate contact surface of print drum member 10 may be light reflective or light absorbent to permit optical sensing of a substrate on the contact surface. A light reflective surface is preferred for many applications and may be provided on an aluminum drum, for example, by plating the exterior contact surface with a thin layer of a highly light reflective material. A non-reflective drum surface may, for example, be plated with a nickel layer having a thickness of about 5 to 15 microns, and most preferably about 10 microns. The reflective layer is preferably thin relative to the substrate support and has a uniform thickness. Reflective materials, such as chrome or other metallic plating materials may also be utilized.

Light reflective substrate supports are generally preferred because they provide good resolution in distinguishing between the highly reflective drum surface and diffusely reflective substrates. Moreover, a wide variety of substrates, including dark colored substrates, can be sensed. Specifically, the position and size of print substrates may be detected using two frame-mounted, retro-reflective optical sensors, and these signals can be used to control placement of the image on the substrate.

Alternatively, the substrate support surface may be provided as a light absorbent surface that is distinguishable from diffusely reflective substrates by means of optical sensors. The substrate support surface may, according to this embodiment, have a matte black anodized surface. This arrangement is suitable for use in printers that print primarily on white or light colored light reflective media.

The dimensions of the substrate support may vary in accordance with different configurations and different types of printing operations. Print drum members 10 having outer diameters of from about 65 mm to 170 mm are preferred, and print drum members 10 having outer diameters of about 152-165 mm are especially preferred. Suitable circumferences of the substrate support are generally determined by the range of substrate sizes suitable for printing in various printing apparatus. Print drum member 10 is preferably provided with a plurality of clamp slots 30 and a rotational orientation aperture 32, as shown in FIG. 1. These features are described in more detail below.

An end bell 12 is rigidly mounted in proximity to each end of print drum member 10. End bells 12 provide support members for mounting print drum member 10 in a printing apparatus for rotation about its central longitudinal axis. End bells 12 comprise a circular support member 14 having an outer diameter corresponding generally to the inner diameter of print drum member 10 and rigidly mounted thereto. End bells 12 additionally comprise a plurality of spokes 16 extending radially between circular support member 14 and inner bearing member 18. Inner bearing member 18 provides a support for mounting the print drum on shafts 20 and 22 for rotation. Bearing members 18 are preferably tapered at their outer diameter to facilitate mounting and removal of the substrate support from its printing environment.

At least one spoke 16' on each end bell is preferably slotted, as shown, to provide passage to the hollow interior of drum member 10 to facilitate mounting and alignment of a substrate clamp assembly. Slotted spokes 16' on each end bell are aligned in corresponding radial positions on opposite ends of print drum member 10. End bells 12 are preferably constructed from die cast aluminum and may be press fit and/or welded into counter-bored end regions of print drum member 10.

Shaft 20 has a drive pulley 24 mounted thereon that cooperates with drive belt 26 to convey rotational motion to print drum member 10 from a drive means. Rotation or indexing of print drum member 10 is preferably controlled by a two-phase stepper motor which is connected, by timing belts and an idler pulley, to drive pulley 24. The reduction ratio of the timing belt drive is designed to map a whole step at the stepper motor into one pixel at the substrate support surface.

In an alterative embodiment, a deep drawn or spun cylindrical aluminum shell with one open and one closed end could be adapted for use as a substrate support of the present invention. The closed end is adapted to hold the clamp assembly and a bearing housing. A separate end bell having a configuration similar to that described above is mounted at the open end of the drum to hold the clamp mechanism and provide a shaft and bearing. This type of assembly is preferably precision turned on actual centers to provide the required diametral tolerances.

According to another alternative embodiment, the print drum member and end bells, as shown in FIGS. 1 and 2, may be constructed from an engineering grade of rigid plastic. The drum tube may, for example, be constructed from precision extruded plastic, while the end bells may be constructed from machined injection moldings. Alternatively, the drum tube and one end bell may be injection molded as a single piece, and a plastic end bell may be mounted at the open end of the print drum.

Composite structures may also be adapted for use in the substrate support of the present invention. Suitable composite structures may include glass fiber filled plastic materials, metallic plated plastic structures, plastic-coated metallic structures, and the like.

A clamp assembly is preferably provided in association with the print drum of the present invention to hold a print substrate in a stationary position with respect to the substrate support surface during printing operations. According to preferred embodiments of the clamp assembly, clamp members project through slots 30 in print drum member 10. A plurality of discontinuous, aligned clamp members and slots 30 extending substantially the width of print drum member 10 are preferably provided as shown in FIG. 4.

The substrate clamp assembly holds the leading edge of a print substrate on the surface of print drum member 10 and is oriented such that the print substrate does not cover rotational orientation aperture 32 when it is mounted in the clamp assembly. The clamping force is sufficient to prevent the leading edge of the print substrate from moving or pulling out of the clamps during printing. The clamp members are also openable and closable at various rotational positions of the print drum and at any point in the print cycle.

Figure 3:
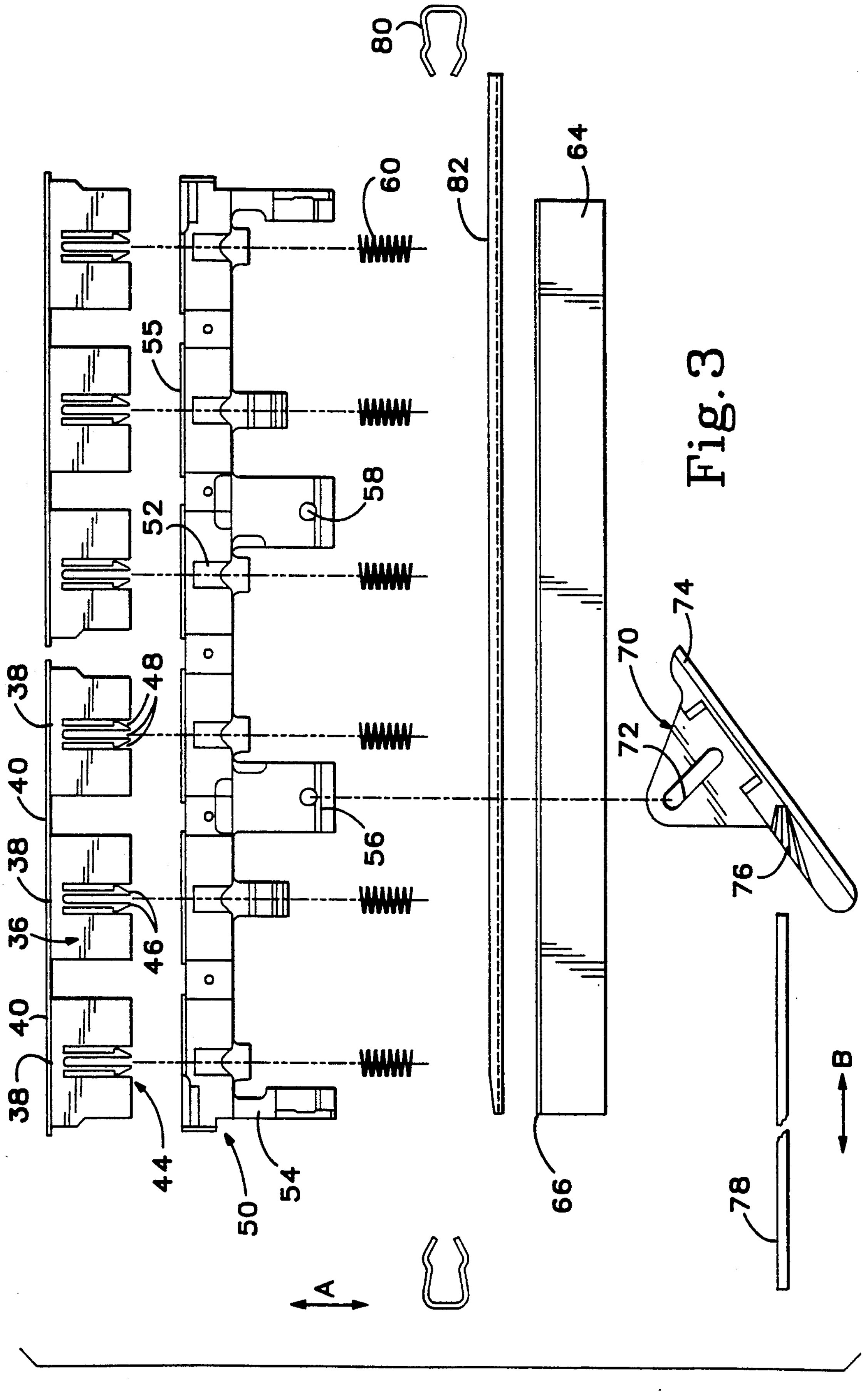
FIG. 3 shows a schematic, exploded view of a substrate clamp assembly utilized in association with the print drum illustrated in FIGS. 1 and 2.
Figure 4:
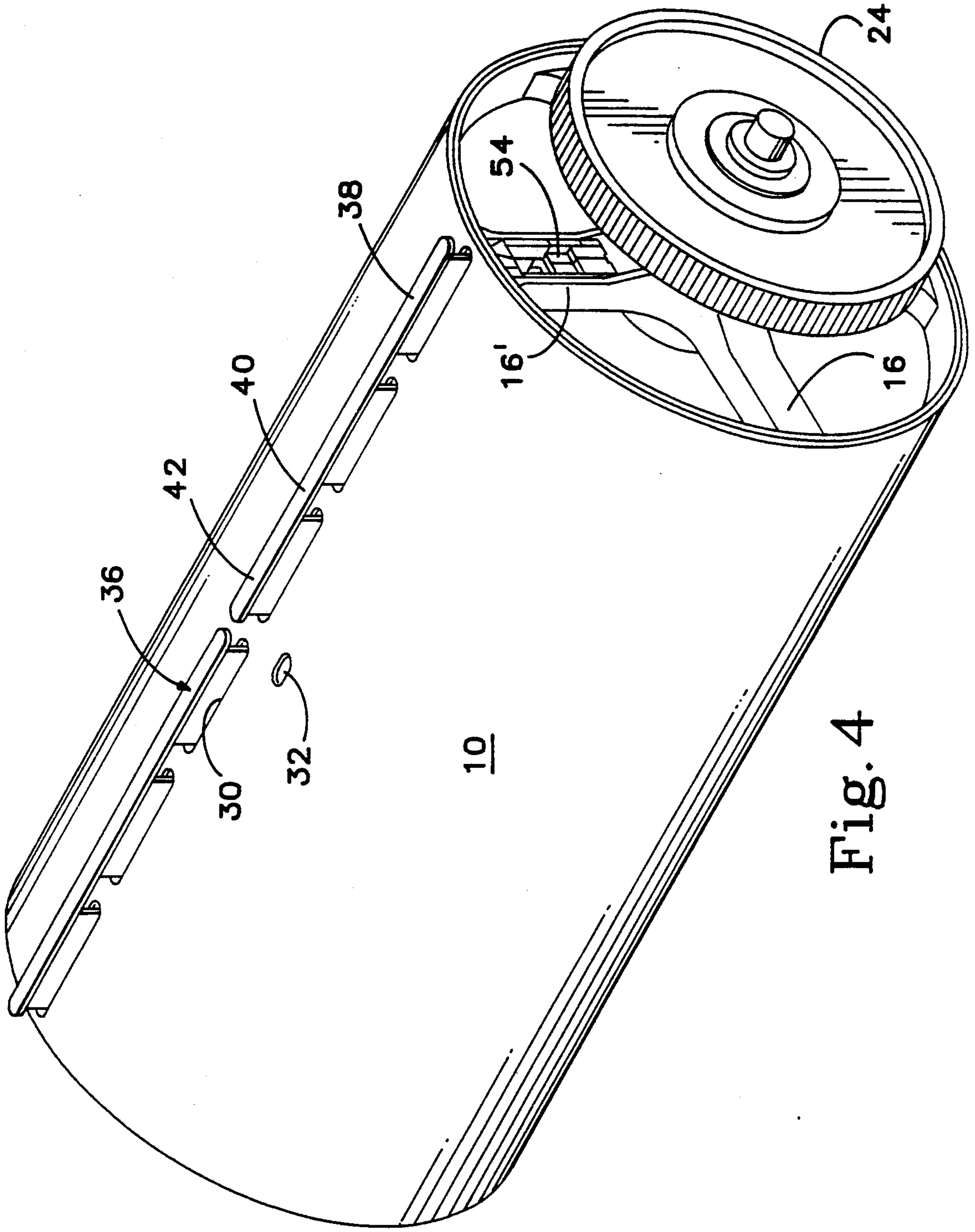
FIG. 4 shows an isometric view of a substrate clamp assembly mounted and interlocked on a print drum of the present invention.

A preferred substrate clamp assembly is illustrated in FIGS. 3 and 4. Substrate grip clamp 36 has a plurality of clamp members 38 that project through clamp slots 30 to hold a print substrate against the surface of print drum member 10 when the clamp assembly is mounted in the print drum member. Clamp members 38 are preferably arranged at an angle of about 90° or less, preferably about 86°, to grip clamp portions projecting through clamp slots 30. Terminal clamping surface 42 thus holds a substrate against the surface of the print drum member when the grip clamp is in a clamped condition. The protruding height of clamp members 38 in the clamped condition is less than the tolerance between the print drum surface and the print head. According to especially preferred embodiments, the protruding height of grip clamps in the clamped condition is about 200 to 400 microns, and most preferably about 330 microns.

Clamp members 38 are joined to one another by continuous flexible segments 40. Flexible segments 40 rest adjacent the exterior surface of print drum member 40 when the clamp assembly is installed, as shown in FIG. 4. This arrangement of clamp members joined by flexible segments permits different clamping sections to clamp against substrates having different thicknesses. For example, the outer clamp members may contact the drum surface, while inner print members may contact the substrate when a narrow print substrate is retained in the clamp assembly. This design permits each individual clamp member 38 to operate independently, and elevation of one clamp member does not result in a corresponding elevation of neighboring clamp members 38.

Although a single substrate grip clamp may be implemented having clamp members 38 corresponding to each clamp slot 30, two separate substrate grip clamps 36 are preferably provided, as shown in FIGS. 3 and 4. This arrangement permits sensors such as optical sensors to detect the distance between the leading edge of the substrate positioned in the clamp assembly and rotational orientation aperture 32. This measurement indicates whether the substrate is properly positioned in the clamp assembly prior to commencement of printing operations. The optical sensors may also detect the size of the print substrate and facilitate positioning of the image on the substrate. Rotational orientation slot 32 functions, in conjunction with optical or other suitable sensors, to provide information concerning the rotational orientation of print drum member 10.

Substrate grip clamps 36 additionally comprise mounting areas 44 provided opposite and generally centered with respect to clamp members 38. Mounting areas 44 include two prongs 46 separated by mounting slots 48. Substrate grip clamps 36 preferably comprise a rigid material such as stainless steel, berylliumcopper, or the like.

The substrate clamp assembly additionally comprises a clamp guide 50 having a plurality of apertures 52 for receiving mounting areas 44 of paper grip clamp 36. Clamp guide 50 is preferably a continuous piece extending substantially the length of the substrate support and is provided with mounting members 54 for mounting the clamp guide on print drum member 10. Projections 56 on clamp guide 50 have pins 58 projecting therefrom for mounting clamp pivot 70. Clamp guide 50 preferably comprises a rigid material such as molded plastic.

A compression spring 60 is provided corresponding to each mounting area 44 of substrate grip clamp 36. When the substrate clamp is assembled, prongs 46 penetrate the compression springs 60 through apertures 52 in clamp guide 50. In this fashion, clamp members 38 are spring biased against the surface of print drum member 10.

Lift bar 64 is the structural element of the clamp assembly that displaces the multiple clamp members 38 simultaneously to release or clamp the print substrate against the surface of print drum member 10. Lift bar 64 has a longitudinal groove 66 that contacts the bottom edges of mounting areas 44 when lift bar 64 is displaced in the upward direction of arrow A to elevate clamp members 38 and thereby release the print substrate. Conversely, when lift bar 64 is displaced in the downward direction of arrow A, clamp members 38 are clamped against the surface of print drum member 10 as a result of the action of compression springs 60. When lift bar 64 is in the lower, clamped position, there is a nominal gap between the lift bar and substrate grip clamp 36 to assure that the full compressive force of compression springs 60 is used to hold the substrate against the drum surface.

Lift bar 64 is actuated by clamp pivot 70 pivotally mounted at pivot point 72 to pin 58 on projection 56 of clamp guide 50. Clamp pivot 70 includes lift bar actuator 74 at one end that displaces lift bar 64 in the upward direction of arrow A upon pivoting of clamp pivot 70 in a counterclockwise direction. This results in opening of substrate grip clamp 36 to release a substrate from or accept a print substrate in the clamp assembly.

Pivot clamp actuating means 76 is provided on pivot clamp 70 opposite lift bar actuator 74. In the embodiment shown in FIG. 3, pivot clamp actuating means 76 is a recess aligned on a substantially horizontal axis. Push rod 78 is reciprocable along the generally horizontal axis of arrow B by means of a linear actuator (not shown). Push rod 78 engages in recess 76 of clamp pivot 70 to rotate the clamp pivot in a counterclockwise direction about pivot axis 72 and thereby displace lift bar 64 and open the substrate grip clamp. When push rod 78 is withdrawn from recess 76, clamp pivot 70 is rotated in a clockwise direction and lift bar 64 is displaced to close the substrate grip clamp and hold a substrate in place on the print drum surface. Clamp pivot 70 therefore functions to translate motion directed in the direction of arrow B to motion directed in the direction of arrow A.

The substrate clamp assembly is preferably assembled using an assembly fork 82 that extends the length of the assembly and serves to maintain a separation between lift bar 64 and compression springs 60 during the assembly process. Clamp guide 50, compression springs 60, assembly fork 82, lift bar 64 and clamp pivot 70 are preassembled and inserted into the hollow interior of print drum member 10 through slotted spoke 16 in end bell 12. Raised surfaces 55 of clamp guide 50 project through slots 30 of print drum member 10 and assist in holding the substrate clamp assembly in place. Substrate grip clamps 36 are then mounted on the preassembled clamp assembly by inserting mounting areas 44 through clamp guide apertures 52 and engaging prongs 46 on compression springs 60. The assembly fork is then withdrawn and clamp members 38 are consequently spring biased, by means of compression springs 60, against the substrate support surface. The clamp assembly, once it has been mounted on print drum member 10 as described above, is permanently interlocked on the print drum. Push rod 78 may then be aligned on the central longitudinal axis of print drum member 10 through a central aperture in end bell 12.

The clamp assembly is retained in position within print drum member 10 by means of a spring clip 80 mounted at slotted spoke 16' of each end bell. Slotted spoke 16' is preferably provided with a groove 17 at its inner radial end for receiving and retaining one leg of spring clip 80. The other leg of spring clip 80 is received in receiving apertures of mounting members 54 on clamp guide 50 to positively hold the clamp guide assembly together and to mount it within the hollow interior of print drum member 10.

In operation, push rod 78 is displaced by a linear actuator to open clamp members 38 to release a print substrate, for example, after it has been printed, or to accept a print substrate prior to initiation of the printing process. Prior to printing, a substrate is fed through a guide and into the open clamp members 38 by means of paper feed rollers. The substrate is then over-driven into the open clamp members to form a deskewing buckle that aligns a leading edge of the substrate uniformly against each of the clamp members 38, independent of the substrate orientation in the feed rollers. After the image has been printed on the substrate, the clamp members are opened and the drum is rotated to transfer the printed substrate to the exit system of the printer.

The following experimental results are set forth for the purpose of more fully understanding preferred embodiments of the present invention, and are not intended to limit the invention in any way.

EXPERIMENTAL RESULTS

Various thermal and physical properties of two drum members were measured and compared. One cylindrical drum member was constructed from 1.27 mm thick aluminum with 10 micron thick nickel plated surface. A second drum member was constructed from stainless steel having a thickness of about 127 microns. Results are shown below in the Table.

TABLE

| | ALUMINUM DRUM | STAINLESS STEEL DRUM |
|---|---|---|
| THERMAL CONDUCTIVITY (k) | 155 W/m · °K. | 16.3 W/m · °K. |
| SPECIFIC HEAT (c) | $9.64 \times 10^2$ J/kg · °K. | $4.61 \times 10^2$ J/kg · °K. |
| DENSITY (d) | 2.742 gm/cm$^3$ | 7.809 gm/cm$^3$ |
| THICKNESS (t) | 1.27 mm | 127 MICRONS |
| THERMAL DIFFUSIVITY = K./(c · d) | $5.93 \times 10^{-5}$ m$^2$/sec | $4.42 \times 10^{-6}$ m$^2$/sec |
| SPECIFIC HEAT PER UNIT AREA = d · t · c | $3.36 \times 10^3$ J/m$^2$ · °K. | $4.56 \times 10^2$ J/m$^2$ · °K. |

The best overall property that describes the desired thermal characteristics of the drum material is thermal diffusivity. The nickel-plated aluminum drum has a thermal diffusivity of greater than $5.0 \times 10^{-5}$ m$^2$/sec, more than ten times that of the stainless steel drum. The thermal performance property that best takes into account the geometry of the drum is the specific heat per unit surface area. The results shown in the table above indicate that the aluminum drum can accept 7.3 times more thermal energy than the stainless steel drum for an equivalent temperature increase.

The transient temperatures of a paper substrate positioned on the two drum surfaces described above were also measured during a printing operation. These results showed that the peak substrate temperature was about 15° C. lower on the aluminum drum than on the stainless steel drum. This represents a substantial reduction in the substrate temperature during printing operations, which facilitates higher quality thermal phase change ink jet printing as a result of more rapid ink droplet solidification.

While in the foregoing specification, this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

We claim:

1. A substrate support for use in a printing apparatus comprising:

a rigid, hollow, cylindrical drum member having uniform thermal characteristics over a portion of its surface area forming a substrate contact surface and having an exterior surface finish that is distinguishable from a substrate mounted thereon by optical sensing; and at least one support means mounted in proximity to a terminal end of the drum member permitting rotation of the drum member about its central longitudinal axis.

2. A substrate support according to claim 1, wherein the exterior surface finish of the drum member is light absorbent.

3. A substrate support according to claim 1, wherein the exterior surface finish of the drum member is light reflective.

4. A substrate support for use in a thermal phase change ink printing apparatus comprising:

a rigid surface having uniform thermal characteristics over a portion of its surface area forming a substrate contact surface, the rigid surface characterized by an exterior face having a surface finish that is distinguishable from a substrate mounted thereon by optical sensing and a thermal diffusivity of greater than about $5.0 \times 10^{-5}$ m$^2$/sec.

5. A substrate support according to claim 4, wherein an exterior face of the rigid surface is light reflective.

6. A substrate support according to claim 5, wherein the exterior face of the rigid surface comprises a light reflective, metallic layer.

7. A substrate support according to clam 4, wherein an exterior face of the rigid surface comprises a light absorbent material.

8. A substrate support for use in a thermal phase change ink printing apparatus comprising:

a rigid surface having uniform thermal characteristics over a portion of its surface area forming a substrate contact surface and having a thermal diffusivity of greater than about $1.3 \times 10^{-5}$ m$^2$/sec, whereby the substrate contact surface promotes dissipation of thermal energy from the rigid surface during printing operations and rapid solidification of phase change ink droplets on a substrate positioned on the substrate contact surface.

9. A substrate support according to claim 8, wherein the rigid surfaces has a thermal diffusivity of greater than about $5.0 \times 10^{-5}$ m$^2$/sec.

10. A substrate support according to claim 8, wherein the substrate support comprises aluminum, magnesium, plastic or a composite structure.

11. A substrate support according to claim 8, additionally comprising a rotational orientation aperture.

12. A substrate support according to claim 8, additionally comprising at least one substrate clamp slot aligned on a longitudinal axis of the rigid surface.

13. A substrate support according to claim 12, comprising a plurality of substrate clamp slots aligned on a common longitudinal axis of the rigid surface.

14. A substrate support according to claim 8, additionally comprising a substrate clamp assembly mounted in proximity to an interior face of the rigid surface and having at least one clamp member projecting through a slot in the rigid surface for clamping a substrate against an exterior face of the rigid surface.

15. A substrate support according to claim 14, comprising a plurality of clamp members projecting through one or more slots in the rigid surface.

16. A substrate support for use in a thermal phase change ink printing apparatus comprising:

a rigid, hollow, cylindrical drum member having uniform thermal characteristics over a portion of its surface area forming a substrate contact surface, the substrate contact surface having a thermal diffusivity that promotes dissipation of thermal energy and rapid solidification of phase change ink droplets on a substrate located on the substrate contact surface; and at least one support means mounted in proximity to a terminal end of the drum member permitting rotation of the drum member about its central longitudinal axis.

17. A substrate support according to claim 16, wherein the cylindrical drum member has a thermal diffusivity of greater than about $1.3\times10^{-5}$ $m^2$/sec.

18. A substrate support according to claim 17, wherein the cylindrical drum member has a thermal diffusivity of greater than about $5.0\times10^{-5}$ $m^2$/sec.

19. A substrate support according to claim 16, wherein the drum member comprises aluminum, magnesium, a plastic or a composite structure.

20. A substrate support according to claim 16, additionally comprising at least one substrate clamp slot aligned on a longitudinal axis of the drum member.

21. A substrate support according to claim 20, additionally comprising a substrate clamp assembly mounted in the hollow interior of the drum member and having at least one clamp member projecting through at least one substrate clamp slot for clamping a substrate against an exterior surface of the drum member.

22. A substrate support according to claim 16, wherein the cylindrical drum member requires no internal support structure.

23. A substrate support according to claim 16, wherein the support means comprises an end bell having a circular support member mountable to a terminal end of the drum member, an inner bearing member, and one or more radial spokes extending between the circular support member and the inner bearing member.

* * * * *

UNITED STATES PATENT AND TRADEMARK OFFICE

CERTIFICATE OF CORRECTION

PATENT NO. : 5,245,358

DATED : September 14, 1993

INVENTOR(S) : Barry D. Reeves and James D. Rise

It is certified that error appears in the above-identified patent and that said Letters Patent is hereby corrected as shown below:

On the Title Page, Item [54], and column 1, line 1
Title: "Sustrate..." should be "Substrate..."

Col. 10, claim 9, line 59, "surfaces" should be "surface".

Signed and Sealed this

Twelfth Day of July, 1994

Attest:

BRUCE LEHMAN

*Attesting Officer* *Commissioner of Patents and Trademarks*